S. WINTER.
CAR DETACHING MECHANISM.
APPLICATION FILED APR. 24, 1909.
1,060,302.
Patented Apr. 29, 1913.
2 SHEETS—SHEET 1.
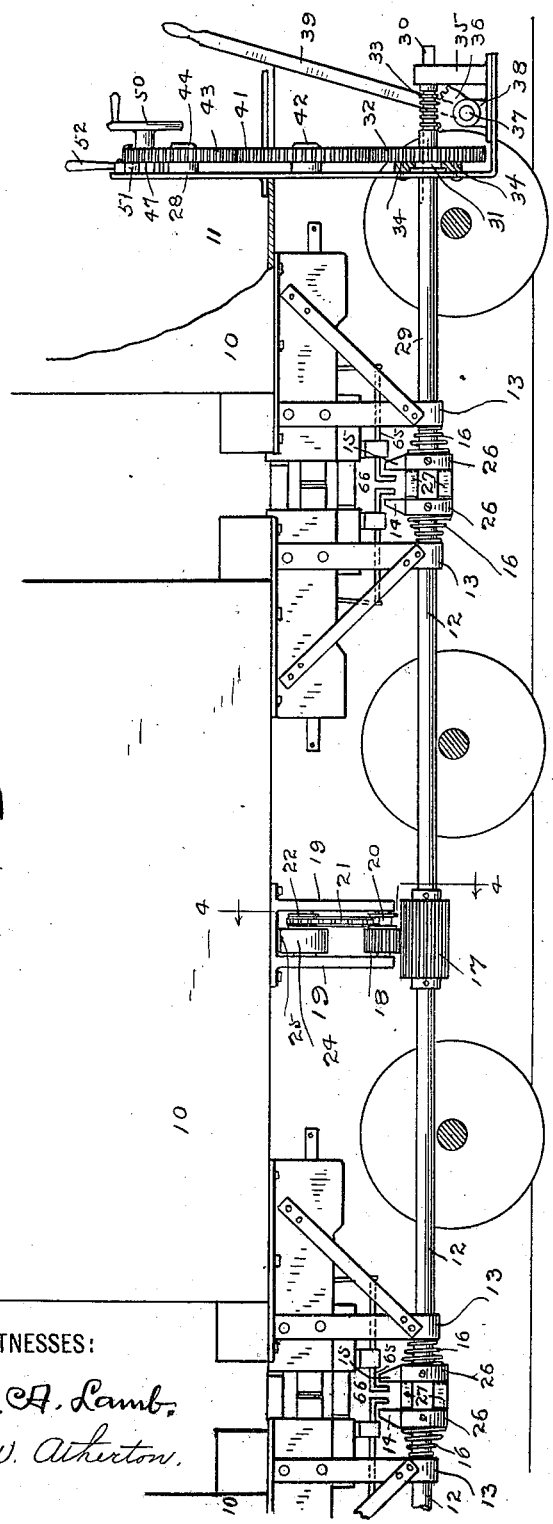
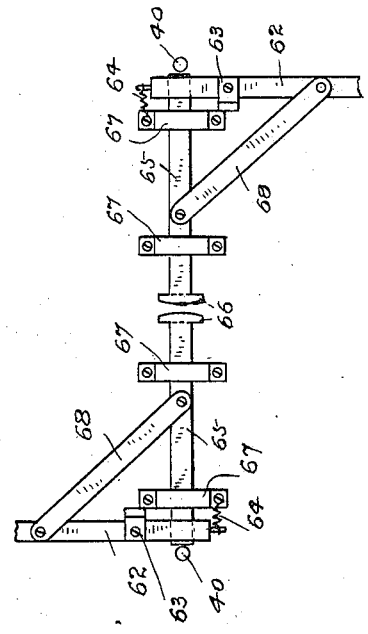
WITNESSES:
H. A. Lamb.
S. W. Atherton.
INVENTOR
Stephen Winter
BY
A. M. Wooster
ATTORNEY S. WINTER.
CAR DETACHING MECHANISM.
APPLICATION FILED APR. 24, 1909.
1,060,302.
Patented Apr. 29, 1913.
2 SHEETS—SHEET 2.
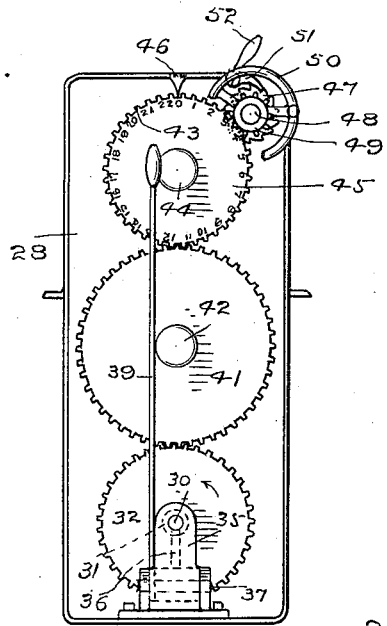
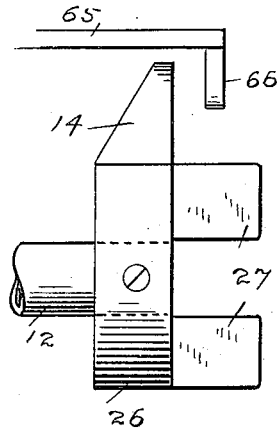
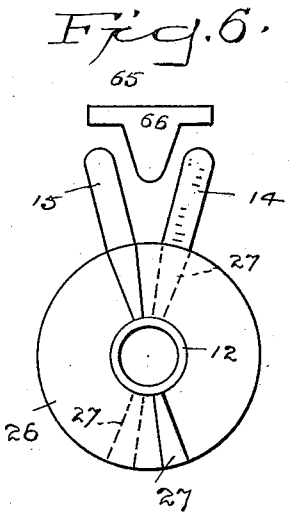
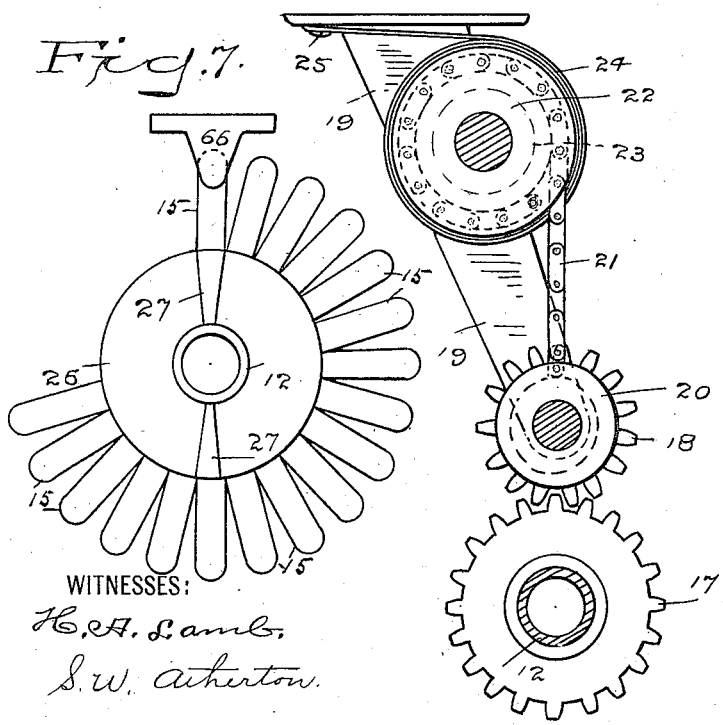
WITNESSES:
H. A. Lamb.
S. W. Atherton.
INVENTOR
Stephen Winter
BY
A. M. Wooster
ATTORNEY

UNITED STATES PATENT OFFICE.

STEPHEN WINTER, OF BRIDGEPORT, CONNECTICUT.

CAR-DETACHING MECHANISM.

1,060,302.  Specification of Letters Patent.  Patented Apr. 29, 1913.

Application filed April 24, 1909. Serial No. 491,892.

*To all whom it may concern:*

Be it known that I, STEPHEN WINTER, a subject of the Emperor of Austria-Hungary, residing at Bridgeport, county of Fairfield, State of Connecticut, have invented an Improvement in Car-Detaching Mechanism, of which the following is a specification.

This invention has for its object to provide mechanism which may be applied to the cars of trains and used in connection with the operating mechanism of the couplings, and which will enable an operator at a controlling station to detach any number of cars counting from the rear end of the train by a single movement.

While my novel detaching mechanism necessarily operates in connection with the couplings, the couplings themselves form no portion of the present invention.

In order to clearly illustrate the operation of the detaching mechanism, I have shown so much as is necessary of the coupling which forms the subject of my pending application, Serial Number 415,532, filed Feb. 12, 1908.

My present invention consists in certain constructions and in certain parts, improvements and combinations which will be hereinafter described and then specifically pointed out in the claims hereunto appended.

In the accompanying drawings forming a part of this specification, in which like characters of reference indicate the same parts, Figure 1 is an elevation illustrating my novel detaching mechanism and its application to cars; Fig. 2 a plan view of so much of a coupling mechanism as is necessary to illustrate the operation of the present invention; Fig. 3 an elevation on an enlarged scale as seen from the right in Fig. 1, illustrating the controlling mechanism; Fig. 4 a section on an enlarged scale on the line 4—4 in Fig. 1, looking in the direction of the arrows; Fig. 5 a side elevation on an enlarged scale of one of the pilot heads and the corresponding slide bar; Fig. 6 an elevation on an enlarged scale of the shafts as seen from the left in Fig. 1, showing the pilot heads in their normal or inoperative position; and Fig. 7 is a similar view looking toward the right from the rear of the eighteenth shaft after the left pilot head of said shaft has been placed in the operative position by the controlling mechanism.

My novel detaching mechanism is adapted for use upon freight or passenger trains and in connection with steam or electric locomotives or motor cars. The mechanism is controlled from a position which I will call the controlling station and which may be in the cab or tender of a steam locomotive or in an electric locomotive or motor car.

10 indicates cars of any type, either freight or passenger, and 11 the controlling station; that is, the position of the controlling mechanism. Each car is provided under the floor thereof with a central longitudinal shaft indicated by 12. The shaft may be solid or tubular as preferred and is mounted to both rotate and reciprocate in suitable bearings indicated by 13. Each end of the shaft has rigidly secured thereto a pilot head lying at an acute angle to the other, said pilot heads normally lying on opposite sides of a central vertical line as indicated in Fig. 6.

For convenience in description I will indicate the pilot heads at the right ends of the shafts by 14 and the pilot heads at the left ends of the shafts by 15. The pilot heads 14 and the pilot heads 15 of the shafts in a series lie normally in respective alinement. Springs 16 between the pilot heads and the bearings act to retain the shafts and pilot heads in place and to return the shafts to their normal position after longitudinal movement. Each shaft carries a gear wheel 17 which meshes with a pinion 18 mounted in a bracket 19 secured to the underside of the car. Mounted to rotate with each pinion is a drum 20 to which one end of a chain 21 is secured, the other end of said chain being wound upon a drum 22 which is mounted in the bracket to rotate with another drum 23 to which one end of a coil spring 24 is attached, the other end of said spring being rigidly secured to the base of the bracket as at 25. These coil springs and connections act to return the shafts to their normal position after rotary movement.

The pilot heads are shown as cast integral with hubs 26 which are rigidly secured to the shafts. The hub of each pilot head is provided on its outer face with outwardly extending operating lugs 27 lying in radial alinement with each other and adapted to engage the corresponding lugs on the contiguous pilot head upon the next shaft. The dotted lines in Fig. 6 are intended to indicate the operating lugs 27 at the opposite end of the shaft. They indicate also the normal position of the operating lugs on the contiguous shafts, the space between the lugs at the contiguous ends of two shafts when in their normal position being just equal to the width of a lug. In use, the operating lugs engage the pilot heads of the contiguous shafts and force said shafts forward when moved longitudinally and engage the operating lugs of contiguous shafts and carry said shafts around when rotated. It will be noted that owing to the space between the contiguous lugs a shaft must be rotated the width of a lug before movement will be imparted to the next shaft.

The pilot heads operate in connection, the operating mechanism of the couplings, in the present instance, in connection with the heads 66 on the slide bars 65. The slide bars are adapted to reciprocate in guides 67 which are rigidly secured to the underside of the car.

62 denotes the releasing levers of the coupling which are shown as pivoted to brackets 63. The short arm of each operating lever is adapted to engage the locking lever 40 of the coupling to actuate the same and uncouple the cars. Each slide bar is connected to the corresponding releasing lever by means of a link 68. Springs 64 act to retain the releasing levers in their normal position. My present detaching mechanism operates on the couplings to detach predetermined cars, as will presently be explained, but does not affect the normal action of the couplings. Cars may be uncoupled from either side by operation of the coupling lever upon that side. Suppose that it is desired to uncouple cars independently of the detaching mechanism. By operating the right releasing lever as seen in Fig. 2 the right slide bar 65 would be moved toward the left by means of link 68, the head 66 on the slide bar would engage the head of the contiguous slide bar and move said slide bar toward the left and by means of the link 68 would cause the left releasing lever to engage the left locking lever 40 which would cause the uncoupling action.

Turning now to Figs. 1 and 3, the following description of the construction mechanism will be understood: 28 denotes a plate or frame which is rigidly secured in place at the controlling station. 29 denotes the controlling shaft which is provided at one end, the left end as seen in Fig. 1, with a pilot head 15 and lugs 27 the same as shafts 12. The other end of shaft 29 is adapted to slide longitudinally in the flanged hub 31 of a gear wheel 32 and is provided with circular rack teeth 33. The reduced end 30 of the shaft is shown as supported in a bearing 35. Gear wheel 32 is secured to the shaft by an ordinary key and slot connection which permits longitudinal movement of the shaft, and the gear wheel is retained against other than rotary movement by means of lugs 34 which engage the flange of the hub and are secured to plate or frame 28. The rack teeth are engaged by a segment gear 36 carried by a rock shaft 37 journaled in a bracket 38 and carrying an operating lever 39. Gear wheel 32 meshes with an intermediate gear wheel 41 mounted on a stud 42 which projects from plate or frame 28. The intermediate gear wheel in turn meshes with an index gear wheel 43 mounted on a stud 44 extending from the plate or frame. This gear wheel bears upon its face an index 45 running in the present instance from zero to twenty-two. The upper portion of the frame is provided with a pointer 46 with which the numerals of the index are adapted to be placed in registration. The numerals of the index are spaced to correspond with the spaces between the lugs 27 on the pilot heads. Movement of the index from 0 to 1 will place the operating lugs 27 on the controlling shaft in engagement with the lugs on the first shaft 12. If the numeral 2 is placed in registration with the pointer, the controlling shaft will be rotated two spaces and the first shaft 12 one space, which will place the left pilot head 15 of said shaft (the controlling station being shown at the right) in operative position. If the numeral 3 is placed in registration with the pointer, the controlling shaft will be rotated three spaces, the first shaft 12 will be rotated two spaces, which will carry its left pilot head 15 toward the right (as seen in Fig. 7), past the operative position and will rotate the second shaft 12 one space and place the left pilot head in operative position, and so on. The index gear wheel is shown as controlled by means of a pinion 47 mounted on a stud 48 extending from the plate or frame. The hub 49 of pinion 47 carries a hand wheel 50 for convenience in operation. A pawl 51 engages pinion 47 to lock it against backward movement and retain it in any position in which it may be placed. The pawl is shown as provided with a hand piece 52 for convenience in manipulation.

The operation is as follows: When the zero of the index is in registration with the pointer, the pilot heads will be in their normal position as in Fig. 6, that is, with alternate pilot heads lying on opposite sides of and out of alinement with the heads 66 of the slide bars, it being understood of course that in Fig. 6 I have indicated the normal position of the right and left pilot heads upon a series of shafts looking from the left end of a train, as seen in Fig. 1, toward the right. The numerals of the index beginning with one correspond with cars counting from the front end of a train. Suppose a train of twenty-two cars and that it is required to detach the rear four cars simultaneously. The operator at the controlling station must of course know the number of cars in the train. If the number of cars is twenty-two and four are to be detached, eighteen would remain in the train. The operator would therefore turn the index gear wheel and place the numeral 18 corresponding with the number of cars to remain in the train in registration with the pointer. The movement of the index gear wheel is communicated by the intermediate gear wheel and gear wheel 32 to the controlling shaft, and the operating lugs upon the controlling shaft will engage the operating lugs upon the contiguous shaft 12, the lugs upon each shaft 12 engaging the lugs upon the next shaft through the series. Fig. 7 shows the position of the left pilot heads after the shafts have been rotated by operation of the index gear wheel. The left pilot head 15 of the eighteenth car will now be in alinement with the corresponding head 66 and the shafts will be locked in this position against the power of coil springs 24 and their connections by the engagement of the pawl with the index gear wheel. The operator now swings operating lever 39 toward the left from the position shown in Fig. 1, the effect of which is to move controlling shaft 29 and the shafts 12 of eighteen cars that are to remain in the train toward the left through the endwise engagement of the operating lugs 27 with the pilot heads. Owing to the fact, however, that the left pilot head upon the eighteenth car is the only one in alinement with a head 66, the coupling between the eighteenth and nineteenth cars will be the only one that will be affected by the operation of the controlling lever. The normal position of the pilot heads, looking toward the right, is shown in Fig. 6, from which it will be apparent that in this position of the pilot heads longitudinal movement of controlling shaft 29 and the shafts 12 on the cars will have no effect on the couplings. When the pilot heads 15, however, are in the position shown in Fig. 7 operation of the controlling lever will move the controlling shaft and the first eighteen shafts 12 toward the left against the power of the left springs 16, and will operate the coupling between the eighteenth and nineteenth cars uncoupling the same and leaving the rear four cars detached from the train. The uncoupling operation is effected as follows: When the shafts are moved toward the left by the controlling lever, the left pilot head 15 of the eighteenth car will engage the head 66 of the left slide bar of said car which in turn will engage the head 66 of the right slide bar of the nineteenth car which in turn will act to uncouple the corresponding coupling, that is the coupling between the eighteenth and nineteenth cars. The operator would hold the controlling lever in the operated position until the cars had separated. The instant the pressure upon the controlling lever is relieved, the springs 16 will act to move the shafts 12 and the controlling shaft toward the right and return the controlling lever to its normal position as in Fig. 1. The pilot heads will, however, remain in the position shown in Fig. 7 until pawl 51 is disengaged from the index gear wheel. The instant the index gear wheel is released coil springs 24 and the chains, drums, pinions 18 and gear wheels 17 will act to oscillate the shafts and return the index gear wheel and the pilot heads to their normal position as in Figs. 1, 3 and 6. Having disposed of a section of the train, the next detaching operation might in the same manner detach one, two or any number of cars. It will be seen that my novel detaching mechanism gives a single operator at the controlling station perfect control of all the cars in a train, any number of which may be cut off at any time when the train is in motion as well as when stationary, thus effecting a great saving in time when it is desired to cut off one or more cars from a train, and in switching, making flying switches, etc. The mechanism is perfectly safe in use as no detachment of cars can take place except by intentional operation of the couplings or where the detaching mechanism is used by operation of the controlling lever preceded by an operation of the index gear wheel which determines the number of cars to be cut off by the operation of the controlling lever.

Having thus described my invention, I claim:—

1. The combination with the operating mechanisms of car couplings, of a rotatable and longitudinally movable shaft provided with pilot heads at its end, the heads being provided with lateral lugs for engaging similar lugs of an adjacent pilot head and with radial lugs for engaging the said operating mechanisms, means for imparting rotary movement to the shaft to engage the lateral lugs with adjacent lugs, and means for imparting longitudinal movement to the shaft to engage the radial lugs and the operating mechanisms.

2. Mechanism for controlling the operating mechanism of a car coupling comprising a shaft mounted for rotary and longitudinal movements on a car, pilot heads carried by the ends of the shaft and provided with lugs that interlock with similar lugs of adjacent heads when the shaft is rotated and with other lugs that engage the coupling operating mechanism when the shaft is moved longitudinally, means for moving the shaft longitudinally, and means for rotating the shaft.

3. The combination with the operating mechanism of a car coupler, and an actuating member therefor, of a shaft provided at each end with a pilot head having lugs adapted to engage similar lugs of a contiguous pilot head, mechanism for rotating the shaft to place one of said pilot heads opposite a contiguous actuating member, means for locking said shaft from rotation, a pinion carried by said shaft, a spring motor, a pinion connected with said motor and meshing with the shaft pinion, whereby said shaft is returned to its normal position when released from the locking means, and means for imparting longitudinal movement to said shaft, whereby the last mentioned pilot head will engage and move the contiguous actuating member.

4. The combination with the operating mechanism of a series of car couplings, and actuating members therefor, of a series of shafts provided at each end with a pilot head having operating lugs constructed to engage operating lugs of contiguous pilot heads, a controlling shaft having a similar pilot head and operating lugs, and means for imparting rotary movement to the controlling shaft whereby a pilot head on either of the shafts may be placed in the operative position, and means for imparting longitudinal movement to said shafts, whereby the last mentioned pilot head will engage and move the contiguous actuating member.

5. The combination with the operating mechanism, of a series of car couplings and slide bars for actuating the same, of a series of shafts parallel with said slide bars and provided at each end with a pilot head, each pilot head being provided with operating lugs adapted to engage similar operating lugs of contiguous pilot heads, each pilot head being also provided with a lug extending radially from its periphery, a controlling shaft having a similar pilot head and operating lugs, means for imparting rotary movement to the controlling shaft whereby the radial lug carried by a pilot head on either of the shafts may be placed in alinement with a contiguous slide bar, and means for imparting longitudinal movement to said shafts, whereby the radial lug of the last mentioned pilot head will engage and move the contiguous slide bar.

6. The combination with the slide bars of car couplings, or shafts provided at each end with pilot heads having radial operating lugs adapted to engage corresponding lugs of contiguous pilot heads, said pilot heads normally lying on opposite sides of the contiguous slide bars and out of operative position, the contiguous operating lugs having between them a space equal to the width of a lug, means for rotating said shafts, whereby a predetermined pilot head may be placed in operative position by bringing contiguous operating lugs into engagement, and means for imparting longitudinal movement to said shafts, whereby the said predetermined pilot head will engage and move the contiguous slide bar.

In testimony whereof I affix my signature in presence of two witnesses.

STEPHEN WINTER.

Witnesses:
  A. M. WOOSTER,
  S. W. ATHERTON.

---

Copies of this patent may be obtained for five cents each, by addressing the "Commissioner of Patents, Washington, D. C."